(12) United States Patent
Todaka et al.

(10) Patent No.: US 11,949,829 B2
(45) Date of Patent: Apr. 2, 2024

(54) MEDIUM PROCESSING APPARATUS THAT INCLUDES NOTIFICATION UNIT, AND METHOD FOR CONTROLLING MEDIUM PROCESSING APPARATUS THAT INCLUDES NOTIFICATION UNIT

(71) Applicant: SEIKO EPSON CORPORATION, Tokyo (JP)

(72) Inventors: Shingo Todaka, Nagano (JP); Kiyoshi Nagaharu, Nagano (JP); Yu Suzuki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/157,884

(22) Filed: Jan. 23, 2023

(65) Prior Publication Data

US 2023/0239416 A1 Jul. 27, 2023

(30) Foreign Application Priority Data

Jan. 24, 2022 (JP) .................................. 2022-008518

(51) Int. Cl.
*H04N 1/00* (2006.01)
*H04N 1/327* (2006.01)

(52) U.S. Cl.
CPC ..... *H04N 1/00824* (2013.01); *H04N 1/00477* (2013.01); *H04N 1/32789* (2013.01)

(58) Field of Classification Search
CPC ........... H04N 1/00824; H04N 1/00477; H04N 1/32789; G06F 3/1236
USPC ....................................................... 358/1.15
See application file for complete search history.

(56) References Cited

U.S. PATENT DOCUMENTS

| 2008/0055631 A1* | 3/2008 | Oono | H04W 8/183 358/1.15 |
|---|---|---|---|
| 2012/0072617 A1 | 3/2012 | Miyasaka et al. | |
| 2014/0084049 A1* | 3/2014 | Shima | G06F 3/1234 235/3 |
| 2022/0086299 A1* | 3/2022 | Jiang | G06F 3/1204 |

FOREIGN PATENT DOCUMENTS

| JP | 2003-076649 A | 3/2003 |
|---|---|---|
| JP | 2015-195038 A | 11/2015 |

\* cited by examiner

*Primary Examiner* — Kent Yip
(74) *Attorney, Agent, or Firm* — Global IP Counselors, LLP (57) ABSTRACT

A medium processing apparatus includes a medium processing mechanism that processes a medium, a first board configured to communicate with an external apparatus by a first communication method and control the medium processing mechanism, a second board configured to communicate with the first board by the first communication method, a third board configured to communicate with the second board by the first communication method and communicate with the external apparatus by a second communication method different from the first communication method, a switcher that switches a communication destination of the first board to the second board or the external apparatus, and a notification section that makes, when the communication destination of the first board is switched to the second board by the switcher, a notification of communication information based on the second communication method.

5 Claims, 4 Drawing Sheets

MEDIUM PROCESSING APPARATUS THAT INCLUDES NOTIFICATION UNIT, AND METHOD FOR CONTROLLING MEDIUM PROCESSING APPARATUS THAT INCLUDES NOTIFICATION UNIT

The present application is based on, and claims priority from JP Application Serial Number 2022-008518, filed Jan. 24, 2022, the disclosure of which is hereby incorporated by reference herein in its entirety.

BACKGROUND

1. Technical Field

The present disclosure relates to a medium processing apparatus and a method for controlling the medium processing apparatus.

2. Related Art

A printer that includes a printer controller body and an engine controller body and that communicates with a host computer through an interface selected from among a plurality of interfaces has been used. In such a printer, the printer controller body and the engine controller body communicate with each other through a specific interface.

However, in the printer described in JP-A-2003-76649, a user does not recognize an interface used for communication with a host computer.

SUMMARY

According to an aspect of the present disclosure, a medium processing apparatus includes a medium processing mechanism that processes a medium, a first board configured to communicate with an external apparatus by a first communication method and control the medium processing mechanism, a second board configured to communicate with the first board by the first communication method, a third board configured to communicate with the second board by the first communication method and communicate with the external apparatus by a second communication method different from the first communication method, a switcher that switches a communication destination of the first board to the second board or the external apparatus, and a notification section that makes, when the communication destination of the first board is switched to the second board by the switcher, a notification of communication information based on the second communication method.

According to another aspect of the present disclosure, in method for controlling a medium processing apparatus including a medium processing mechanism that processes a medium, a first board configured to communicate with an external apparatus by a first communication method and control the medium processing mechanism, a second board configured to communicate with the first board by the first communication method, a third board configured to communicate with the second board by the first communication method and communicate with the external apparatus by a second communication method different from the first communication method, a switcher that switches a communication destination of the first board to the second board or the external apparatus, and a notification section, the notification section makes, when the communication destination of the first board is switched to the second board by the switcher, a notification of communication information based on the second communication method.

DESCRIPTION OF EXEMPLARY EMBODIMENTS

1. First Embodiment

The medium processing apparatus 1 is used, for example, in retail businesses and banks that receive and process checks from customers. The medium processing apparatus 1 reads images of a number, a signature, and so on on a front of a check and prints an acknowledgment of receipt on a back. At this time, the medium processing apparatus 1 may also obtain a check number from the read image and make a credit inquiry to an apparatus installed in a bank or the like that has issued the check.

1-1 Configuration of Medium Processing Apparatus

Figure 1:
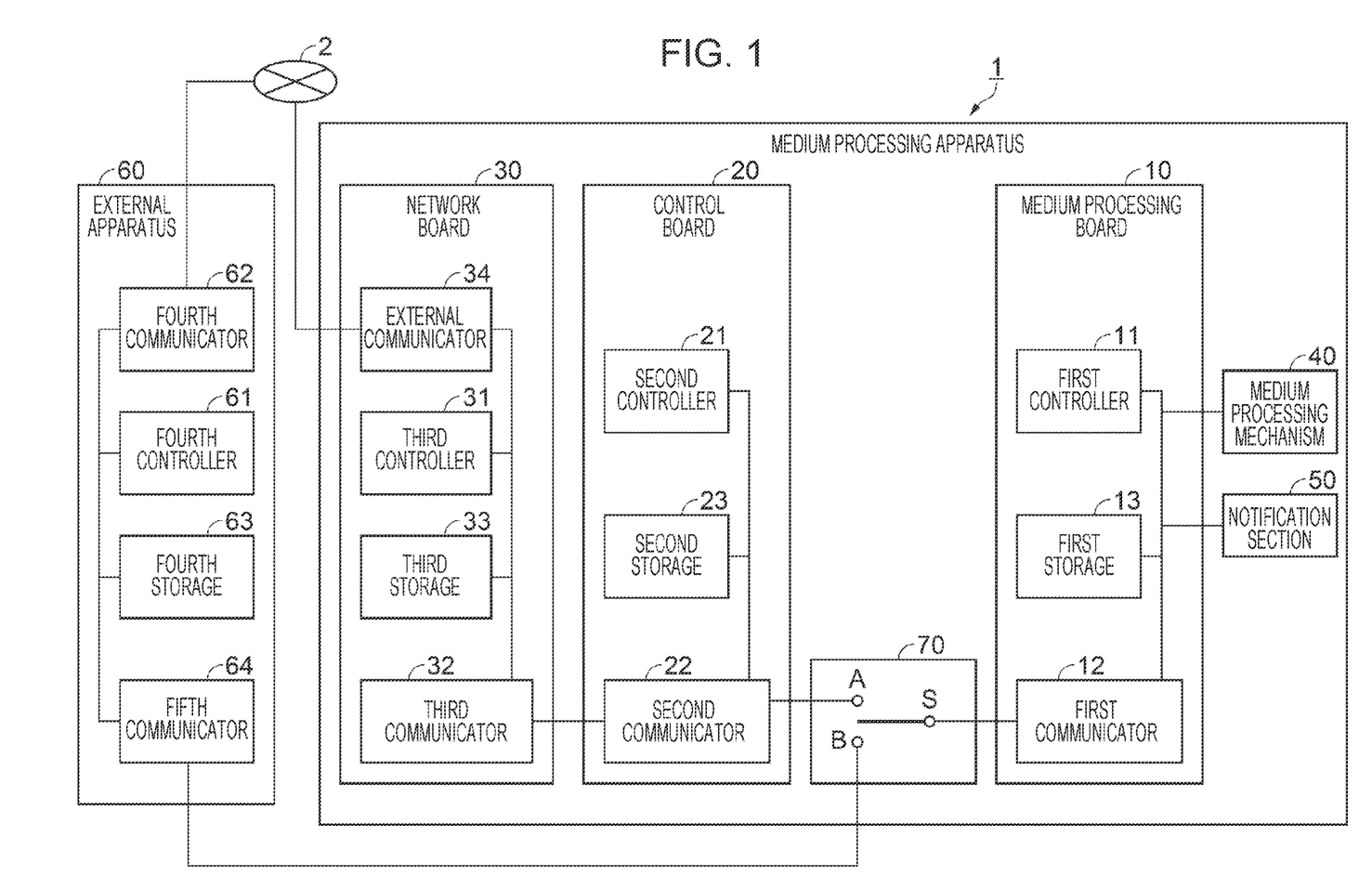
FIG. 1 is a block diagram illustrating a configuration of a medium processing apparatus.

As illustrated in FIG. 1, the medium processing apparatus 1 includes a medium processing board 10 serving as a first board, a control board 20 serving as a second board, a network board 30 serving as a third board, and a switch 70 serving as a switcher.

The control board 20 may communicate with the medium processing board 10 by a USB (Universal Serial Bus) which is a first communication method and a serial communication method, and also communicate with the network board 30 by a USB.

The medium processing board 10 may control a medium processing mechanism 40 which processes a check as a medium, and a notification section 50.

The network board 30 may communicate with an external apparatus 60, such as a computer or a tablet terminal, via a network 2 using a LAN (Local Area Network), such as the Ethernet ((registered trademark) or IEEE802.3), which is a second communication method and a network communication method different from the USB.

The medium processing board 10, the control board 20, the network board 30, and the switch 70 will be individually described in detail with reference to FIG. 1. Note that communication methods and communication paths are also referred to as interfaces.

The medium processing board 10 includes a first controller 11, a first communicator 12, and a first storage 13.

The first storage 13 is a rewritable nonvolatile memory, such as a flash ROM (Read Only Memory), and may store firmware, which is a program, and predetermined information including information pertaining to communication using the first communicator 12. The first storage 13 also includes a RAM (Random Access Memory) which is a volatile memory used by the first controller 11 as a work area.

The first controller 11 includes a CPU (Central Processing Unit) that executes various control operations on the individual sections in the medium processing board 10. The CPU is also referred to as a processor. The CPU of the first controller 11 reads and executes the firmware stored in the first storage 13.

The first communicator 12 of the medium processing board 10, a second communicator 22 of the control board 20, and a third communicator 32 of the network board 30 may communicate with one another using a serial communication method compliant with the USB standard.

Here, the USB standard includes USB 1.1 through USB 3.0 or any later extended standard.

The second communicator 22 of the control board 20 operates on a host side in the USB standard, and the first communicator 12 and the third communicator 32 of the network board 30 operate on a device side in the USB standard.

In the USB standard, communication between the host side and the device side is scheduled by the host side, and the device side transmits and receives data in accordance with a request issued by the host side. Note that it is assumed, in the following description, that a request from the control board 20 on the host side is omitted, except when particularly necessary for explanation.

Inside the medium processing apparatus 1, the second communicator 22 of the control board 20 and the first communicator 12 of the medium processing board 10 are coupled to each other by a USB cable, and the second communicator 22 of the control board 20 and the third communicator 32 of the network board 30 are also coupled to each other by a USB cable.

The USB cable is based on the USB standard and has two power lines, VBUS and GND, and two data lines, D+ and D−. The two power lines VBUS and GND and the two data lines D+ and D− are also collectively referred to as a USB bus.

The first communicator 12 of the medium processing board 10 is constituted by a communication circuit having a connector and a USB device controller which is a communication IC (Integrated Circuit) operating on the device side based on the USB standard.

Furthermore, the first communicator 12 has a memory. This memory stores device information pertaining to USB communication of the medium processing board 10. The device information is data in a format defined by the USB standard and includes, for example, a class ID (Identification or Identifier), a vendor ID, a product ID, a vendor name, a model name, and a USB serial number. The device information at least includes the class ID, the product ID, and the device model name. Furthermore, the device information may be stored in the first storage 13.

The medium processing mechanism 40 has a so-called printer-and-scanner function for processing checks. Specifically, the medium processing mechanism 40 includes, for example, an image sensor which is a scanner employing a contact image sensor (CIS) method, a transport mechanism, and a printer, that are not illustrated.

The transport mechanism, which includes a transport motor and transport rollers, transports checks along a transport path that leads from an insertion slot to an ejection slot. The image sensor and the printer are located in the transport path.

A check is read by the image sensor or printed by the printer while being transported along the transport path by the transport mechanism.

The image sensor includes a light source, which is an RGB (Red, Green, and Blue) LED (Light Emitting Diode), a lens for imaging, a group of RGB 3-channel photodetectors, and an image processing IC. The image sensor optically reads reflection of LED light emitted on the check and outputs image data.

The image data output by the image sensor has 8 bits for each RGB color, that is, 24 bits in total, for example. The image data may have any other number of bits and may be constituted by black and white data, that is, monochrome data.

The image sensor may be either a C-MOS (Complementary Metal Oxide Semiconductor) type or a CCD (Charge Coupled Devices) type, and a resolution may range from 200 dpi (dots per inch) to 300 dpi.

The printer has an ink jet head and perform printing by discharging ink onto a check.

Under the control of the first controller 11 of the medium processing board 10, the medium processing mechanism 40 reads a number, a signature, and other images on a surface of the check using the image sensor while transporting the check set on the insertion port by the user using the transport mechanism, prints information on a receipt on a back surface using the printer, and ejects the check to the ejection slot.

The first controller 11 obtains the image data read by the image sensor and transmits the image data to the external apparatus 60.

The first controller 11 may perform a character recognition process on the image data to obtain a check number and other information, and then make an inquiry to the external apparatus 60, which is an apparatus installed in a bank that has issued the check, for example, to make a credit.

The notification section 50 is, for example, a liquid crystal display or an LED. Under the control of the first controller 11 of the medium processing board 10, the notification section 50 notifies the user of predetermined information by display. The notification section 50 may be a speaker or the like for making a notification on predetermined information by sound.

The notification section 50 may notify the user of communication information pertaining to communication of the medium processing apparatus 1. The notification section 50 may also notify the user of information on a setting method of the communication of the medium processing apparatus 1 or the like. In addition, the notification section 50 may also notify the user of a state of the medium processing board 10, the control board 20, the network board 30, or the medium processing mechanism 40, such as an error state, and a coping process.

The control board 20 includes a second controller 21, a second communicator 22, and a second storage 23. Note that descriptions of portions in the second controller 21 and the second storage 23 which are the same as those in the first controller 11 and the first storage 13 of the medium processing board 10 are omitted.

A configuration of the second communicator 22 of the control board 20 and control of the second communicator 22 performed by the second controller 21 which are different from those of the first communicator 12 of the medium processing board 10 are mainly described.

The second communicator 22 is composed of a communication circuit that includes a USB host controller, which is a communication IC that operates on the host side based on the USB standard, and a connector.

The second storage 23 stores an OS (Operating System) and various USB device drivers.

The second controller 21 executes the OS read from the second storage 23 so as to operate on the host side based on the USB standard.

On the other hand, each of the first communicator 12 of the medium processing board 10 and the third communicator 32 of the network board 30 includes a USB device controller, stores device information, and operates on the device side based on the USB standard.

The second controller 21 obtains device information individually from the medium processing board 10 and the network board 30 through the second communicator 22, specifies corresponding device drivers, and performs control.

For example, the second controller 21 specifies a device driver having a printer-and-scanner function corresponding to the medium processing board 10 for the medium processing board 10. In addition, the second controller 21 specifies a device driver having a network communication function corresponding to the network board 30 for the network board 30.

The second controller 21 then reads the individual specified device drivers from the second storage 23 and executes the device drivers.

The second controller 21, on the host side based on the USB standard, may transmit and receive data, commands, and the like via a USB to and from the medium processing board 10 and the network board 30 by means of the second communicator 22.

Note that the second controller 21 does not directly control the medium processing mechanism 40 or the notification section 50. For example, the second controller 21 makes a notification for the user from the notification section 50 through the medium processing board 10.

The network board 30 includes a third controller 31, a third communicator 32, and a third storage 33. Note that, in these sections, descriptions of portions the same as those of the first controller 11, the first communicator 12, and the first storage 13 of the medium processing board 10 are omitted.

The third communicator 32 includes a USB device controller and operates on the device side in accordance with the USB standard. Furthermore, a memory of the third communicator 32 stores device information pertaining to the USB of the network board 30. The device information may be stored in the third storage 33.

The network board 30 is different from the medium processing board 10 in communication in that the network board 30 includes an external communicator 34. Therefore, a configuration of the external communicator 34 and control of the external communicator 34 performed by the third controller 31 will be mainly described.

The external communicator 34 includes a communication circuit having a connector, a communication cable, a MAC (Media Access Control) section, and a PHY (Physical Layer) section that are specified in the Ethernet and that are not illustrated.

The PHY section is a controller responsible for the physical layer of the Ethernet. The PHY section converts encoded data into signals based on a signal standard of the communication cable and encodes received signals. The MAC section is a controller responsible for the data link layer of the Ethernet.

The third storage 33 stores software for processing of a communication protocol of the Ethernet and drivers for communication using the Ethernet.

The third storage 33 further stores a MAC address and an IP address of the external apparatus 60. The third controller 31 executes the software for the Ethernet and the drivers read from the third storage 33.

The third controller 31 reads, from the third storage 33, the MAC address and the IP address of the external apparatus 60 to generate a frame pertaining to the Ethernet, and transmits the frame from the external communicator 34 to the external apparatus 60 via the network 2.

The third storage 33 further stores a MAC address and an IP address of the medium processing apparatus 1. The third controller 31 receives, using the external communicator 34, a frame pertaining to the Ethernet transmitted from the external apparatus 60 to the medium processing apparatus 1 via the network 2. The third controller 31 reads the MAC address and the IP address of the medium processing apparatus 1 from the third storage 33 and determines whether the received frame is addressed to the medium processing apparatus 1.

When determining that the received frame is addressed to the medium processing apparatus 1 based on the MAC address and the IP address of the medium processing apparatus 1, the third controller 31 stores data included in the frame in the third storage 33 and performs a predetermined process. Thus, the medium processing apparatus 1 communicates with the external apparatus 60 by the Ethernet.

Note that the network 2 may also communicate with an external network via a router not illustrated. The medium processing apparatus 1 may communicate through a router to the external apparatus 60 even when the external apparatus 60 is connected to an external network.

Note that the third controller 31 does not directly control the medium processing mechanism 40 or the notification section 50. For example, the third controller 31 causes the notification section 50 to make a notification for the user through the control board 20 and the medium processing board 10.

The external apparatus 60 includes a fourth controller 61, a fourth communicator 62, a fourth storage 63, and a fifth communicator 64. The fourth storage 63 stores an application for performing processing on checks. The fourth controller 61 executes the application read from the fourth storage 63, and the fourth communicator 62 transmits, for example, a medium processing request to the medium processing apparatus 1 that performs the processing on checks.

Note that descriptions of portions, regarding the CPU and the like, of the fourth controller 61 and the fourth storage 63 of the external apparatus 60 which are the same as those of the first controller 11 and the first storage 13 of the medium processing board 10 of the medium processing apparatus 1 are omitted. Furthermore, descriptions of portions, regarding the Ethernet and the like, of the fourth communicator 62 which are the same as those of the external communicator 34 of the network board 30 of the medium processing apparatus 1 are omitted. Furthermore, descriptions of portions, regarding the USB and the like, of the fifth communicator 64 which are the same as those of the second communicator 22 of the control board 20 of the medium processing apparatus 1 are omitted.

Control of the fourth communicator 62 performed by the fourth controller 61 of the external apparatus 60 that is different from control of the external communicator 34 of the network board 30 of the medium processing apparatus 1 will now be described.

The fourth storage 63 of the external apparatus 60 stores the MAC address and the IP address of the medium processing apparatus 1. The fourth controller 61 reads, from the fourth storage 63, software pertaining to processing of the Ethernet communication protocol and a driver pertaining to the communication using the Ethernet and executes the software and the driver. The fourth controller 61 reads the MAC address and the IP address of the medium processing apparatus 1 from the fourth storage 63, generates a frame, and transmits the frame to the medium processing apparatus 1 using the fourth communicator 62 via the network 2.

The fourth storage 63 also stores the MAC address and the IP address of the external apparatus 60. When receiving the frame from the medium processing apparatus 1 by the fourth communicator 62, the fourth controller 61 reads the MAC address and the IP address of the external apparatus 60 from the fourth storage 63 to determine whether the frame is addressed to the external apparatus 60.

When the fourth controller 61 determines that the received frame is addressed to the external apparatus 60, data included in the frame is stored in the fourth storage 63 and a predetermined process is performed. Thus, the external apparatus 60 communicates with the medium processing apparatus 1 via the Ethernet.

Next, control of the fifth communicator 64 pertaining to the USB of the external apparatus 60 will be described. The fifth communicator 64 is composed of a communication circuit that includes a USB host controller, which is a communication IC operating on the host side based on the USB standard, and a connector. The fifth communicator 64 of the external apparatus 60 is coupled to the medium processing apparatus 1 via a USB cable.

Control based on the USB of the external apparatus 60 on the medium processing board 10 of the medium processing apparatus 1 is the same as the control based on the USB of the control board 20 on the medium processing board 10 as described above.

In other words, the fourth storage 63 of the external apparatus 60 stores an OS and various types of USB device driver. The fourth controller 61 of the external apparatus 60 reads the OS from the fourth storage 63 and executes the read OS to operate on the host side of the USB standard.

The fourth controller 61 uses the fifth communicator 64 to obtain device information from the medium processing board 10 of the medium processing apparatus 1 to specify device drivers corresponding to the printer and the scanner.

The fourth controller 61 then reads and executes the individual specified device drivers from the fourth storage 63.

The fourth controller 61, on the host side of the USB standard, may transmit and receive data, commands, and the like via the USB to and from the medium processing board 10 by means of the fifth communicator 64.

Next, the switch 70 of the medium processing apparatus 1, which is a switcher, will be described. The switch 70 switches a communication destination of the medium processing board 10 communicating via the USB to the control board 20 or the external apparatus 60.

As illustrated in FIG. 1, the switch 70 has a contact point S which is a movable contact point that moves in accordance with a user operation and contact points A and B which are fixed contact points that do not move.

The contact point S is coupled to the first communicator 12 of the medium processing board 10 via the USB cable. The contact point A is coupled to the second communicator 22 of the control board 20 via the USB cable. The contact point B is coupled to the fifth communicator 64 of the external apparatus 60 via the USB cable.

The user operates the contact point S of the switch 70 to switch a coupling destination of the contact point S to the contact point A or the contact point B.

As described above, the two electric lines VBUS and GND and the two data lines D+ and D− that are included in a USB bus are arranged in each of the first communicator 12 of the medium processing board 10, the second communicator 22 of control board 20, and the fifth communicator 64 of the external apparatus 60.

The switch 70 performs switching on at least two of the lines, that is, the VBUS electric line and the D+ data line, in the individual USB buses. The switch 70 may perform switching on all the lines in the individual USB buses.

As a result, the switch 70 switches the communication destination of the first communicator 12 of the medium processing board 10 to the second communicator 22 of the control board 20 or the fifth communicator 64 of the external apparatus 60.

1-2. Method for Controlling Medium Processing Apparatus

When the medium processing apparatus 1 is turned on, the second controller 21 of the control board 20 is activated, and the various sections in the control board 20 are controlled by the second controller 21.

Similarly, the first controller 11 of the medium processing board 10 is also activated to start control of the various sections in the medium processing board 10. Furthermore, the third controller 31 of the network board 30 is also activated to start control of the various sections in the network board 30.

The following example will now be described. That is, the user operates the contact point S of the switch 70 to switch the coupling destination of the contact point S to the contact point A so that a communication destination of the first communicator 12 of the medium processing board 10 is switched to the second communicator 22 of the control board 20. Note that it is assumed that the user has finished the operation on the switch 70 before the medium processing apparatus 1 is turned on.

Figure 2:
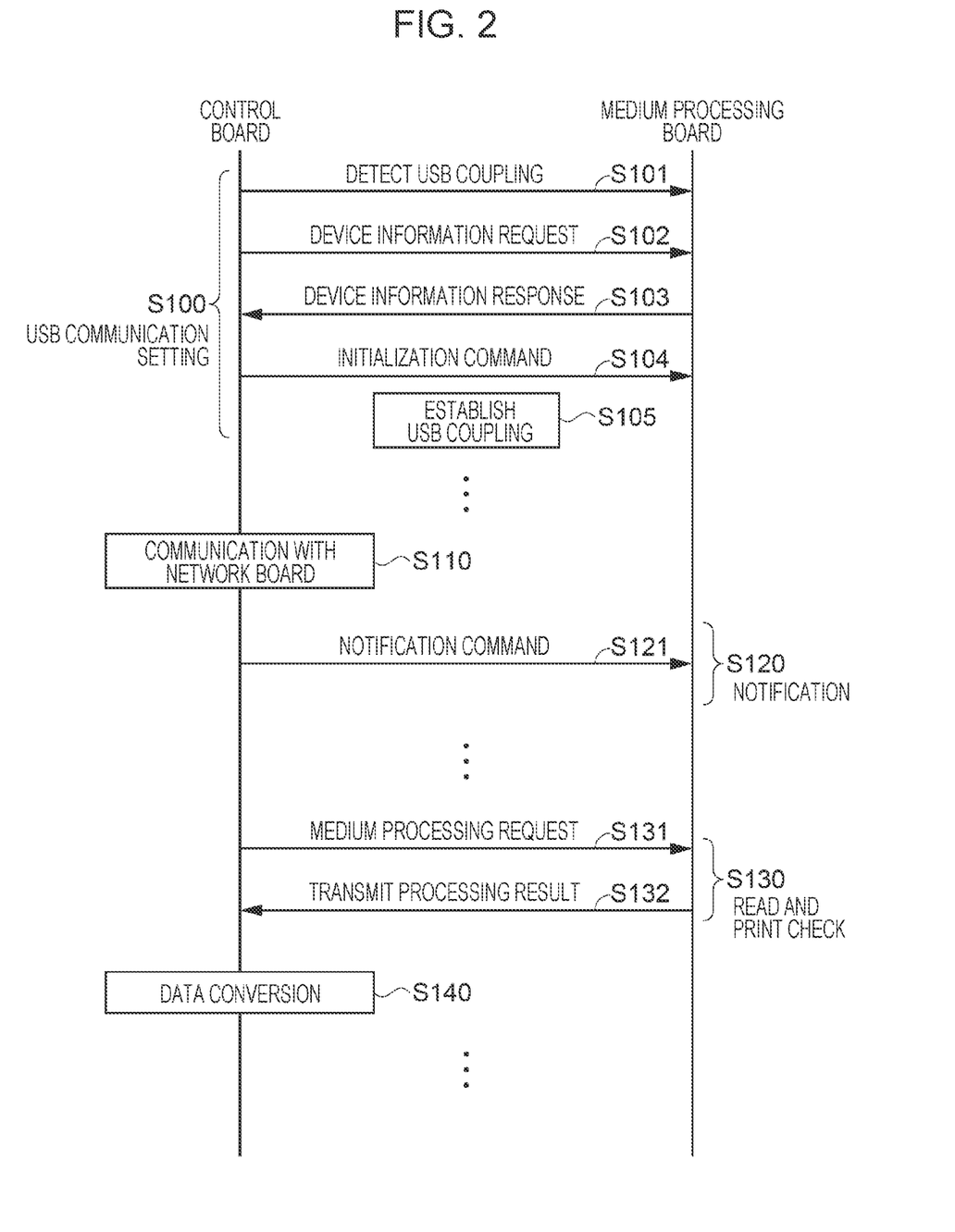
FIG. 2 is a state transition diagram illustrating control of a control board and a medium processing board when the control board is selected.

With reference to FIG. 2, control performed by the control board 20 and the medium processing board 10 will be described. In the following, individual operations are executed under the control of the second controller 21 of the control board 20 and under the control of the first controller 11 of the medium processing board 10. For ease of explanation, the second controller 21 and the first controller 11, which are main bodies of the control, are partially omitted in the following description.

When the switching of the switch 70 is performed, communication between the first communicator 12 of the medium processing board 10 and the second communicator 22 of the control board 20 becomes available via the USB.

First, the control board 20 and the medium processing board 10 perform USB communication settings (S100).

Specifically, the first communicator 12 of the medium processing board 10 starts operation as a USB device and generates a voltage of 5V on the VBUS line.

The control board 20 starts operation as a USB host based on the OS, detects the generation of the voltage of 5V on the VBUS line using the second communicator 22, and detects USB coupling with the medium processing board 10 (S101).

The control board 20 requests device information from the medium processing board 10 via the second communicator 22 (S102). The medium processing board 10 transmits the device information stored in the memory of the first communicator 12 or the first storage 13 to the control board 20 in response to the request (S103).

Based on the device information received from the medium processing board 10, the second controller 21 of the control board 20 specifies and executes a device driver corresponding to the medium processing board 10 from among the plurality of USB device drivers stored in the second storage 23.

The control board 20 transmits an initialization command to the medium processing board 10 (S104). Based on the initialization command, the medium processing board 10 resets a USB bus coupling state through the first communicator 12. As a result, USB coupling is established between the control board 20 and the medium processing board 10 (S105).

On the other hand, at this time, the network board 30 may communicate with the external apparatus 60 by the Ethernet, and the control board 20 may communicate with the network board 30 by the USB as described below (S110).

Furthermore, as described below, the network board 30 transmits the first command including communication information pertaining to the Ethernet to the control board 20.

Based on the first command, the control board 20 and the medium processing board 10 execute a process related to notification (S120).

Specifically, when receiving the first command from the network board 30 through the second communicator 22, the control board 20 generates a notification command, that is a second command, to be transmitted to the medium processing board 10 (S121). The notification command includes communication information of the first command.

When the medium processing board 10 receives the notification command through the first communicator 12, a notification of the communication information included in the notification command is issued by the notification section 50.

The communication information is, for example, the MAC address or the IP address of the medium processing apparatus 1 based on the Ethernet. Alternatively, the communication information is the MAC address or the IP address of the external apparatus 60 based on the Ethernet. The communication information includes at least one of these information items.

When the notification section 50 notifies the user of the communication information, the user may recognize that the medium processing apparatus 1 communicates with the external apparatus 60 through the Ethernet.

Note that, when the first communicator 12 receives the notification command, the first controller 11 of the medium processing board 10 may determine that the coupling destination of the contact point S of the switch 70 has been switched to the contact point A. In other words, the first controller 11 may determine that the communication destination of the first communicator 12 is switched to the second communicator 22 of the control board 20 by the switch 70.

Furthermore, when the notification command is received, the first controller 11 may also determine that the medium processing board 10 communicates with the external apparatus 60 by the Ethernet instead of the USB.

The first controller 11 may make a notification indicating that the medium processing apparatus 1 communicates with the external apparatus 60 through the Ethernet using the notification section 50.

The medium processing board 10 may make a notification of information indicating that the medium processing apparatus 1 communicates with the external apparatus 60 via the Ethernet, instead of or together with the communication information.

Next, control performed by the medium processing board 10 to read and print a check in response to a medium processing request supplied from the fourth communicator 62 of the external apparatus 60 (S130) will be described.

As described below, when receiving a medium processing request via the Ethernet from the fourth communicator 62 of the external apparatus 60 by means of the external communicator 34, the network board 30 transmits the medium processing request to the control board 20 by means of the third communicator 32.

The control board 20 transmits the received medium processing request to the medium processing board 10 by means of the second communicator 22 (S131). The second controller 21 of the control board 20 may transmit the received medium processing request after converting the medium processing request into a command or data that may be interpreted by the first controller 11 of the medium processing board 10.

When the medium processing board 10 receives the medium processing request through the first communicator 12, the medium processing mechanism 40 reads an image of a check and prints information on its receipt.

The medium processing board 10 generates image data read by the image sensor of the medium processing mechanism 40 as a processing result. The processing result may include information pertaining to a printing result indicating whether the printing is successfully performed by the printer in the medium processing mechanism 40 or the like.

The medium processing board 10 transmits the processing result to the control board 20 through the first communicator 12 (S132).

The control board 20 transmits the received processing result to the network board 30 through the second communicator 22.

The network board 30 transmits the processing result received through the third communicator 32 to the external apparatus 60 through the external communicator 34.

As described above, the image data output by the image sensor of the medium processing mechanism 40 has 24 bits of RGB in total. The control board 20 receives the image data having of 24 bits of RGB as the processing result from the medium processing board 10.

The second controller 21 of the control board 20 converts the received image data having 24 bits of RGB serving as the processing result into a data format that may be easily processed by the external apparatus 60 (S140).

The data format of a conversion target is JPEG, for example. The data format of a conversion target may be PNG or TIFF, or may be any other compression method or any compression ratio.

The second controller 21 of the control board 20 may read a driver for image processing stored in the second storage 23 before executing the data conversion.

Note that an instruction of the data conversion and a type of data format of a conversion target may be included in the medium processing request. The control board 20 performs the data conversion instructed by the medium processing request. Furthermore, the data conversion may be performed by the first controller 11 of the medium processing board 10.

Thus, when receiving the medium processing request from the external apparatus 60 through the network board 30 and the control board 20, the medium processing board 10 processes the check by means of the medium processing mechanism 40 and transmits a processing result to the control board 20.

At this time, the control board 20 may convert the received processing result into a different data format and transmit the processing result to the external apparatus 60 through the network board 30.

Note that the control board 20 may transmit the received image data having 24 bits of RGB to the external apparatus 60 through the network board 30 without the data conversion.

Figure 3:
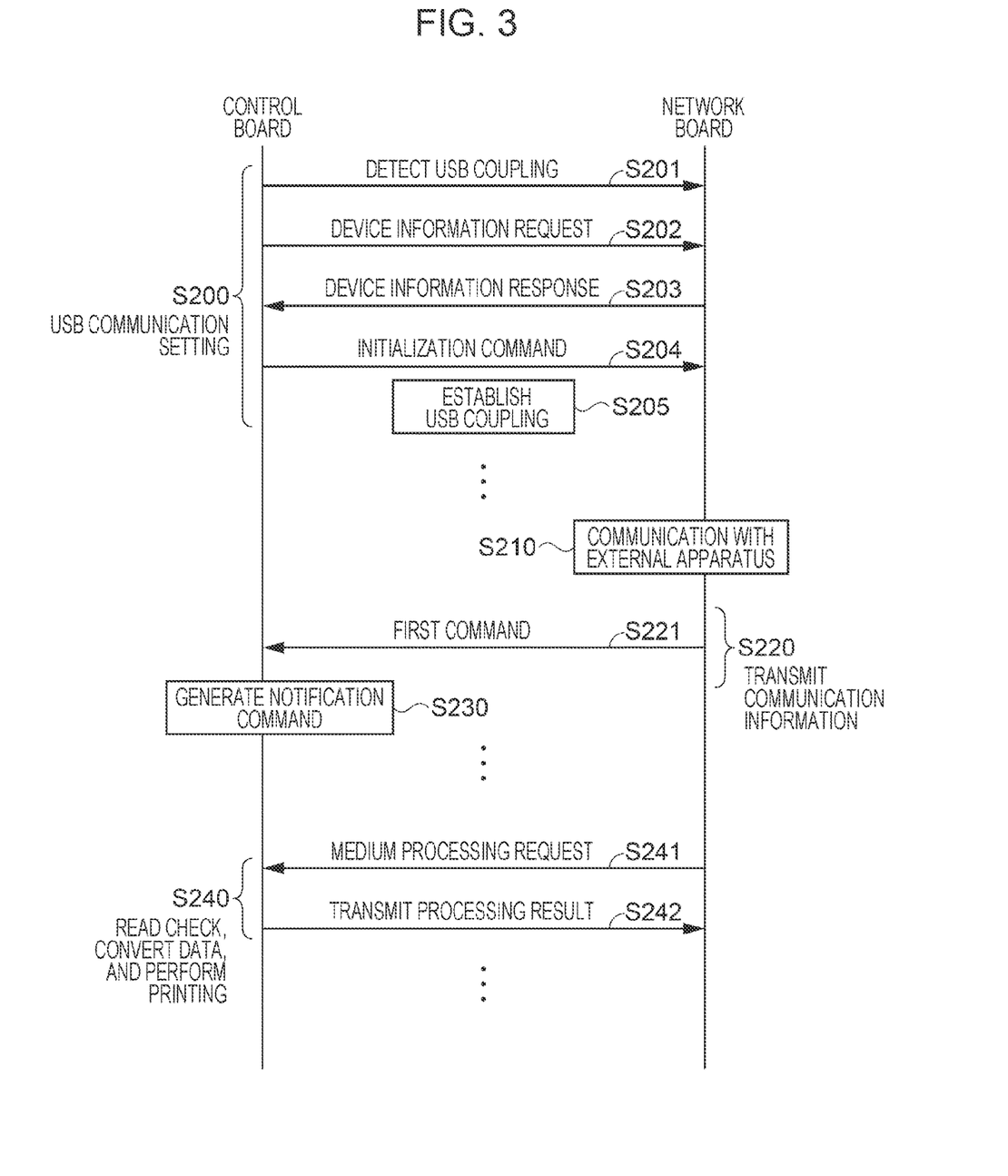
FIG. 3 is a state transition diagram illustrating control of the control board and a network board when the control board is selected.

Subsequently, with reference to FIG. 3, control of the control board 20 and the network board 30 performed when a coupling destination of the medium processing board 10 is switched to the control board 20 will be described. Note that, in the following, individual operations are executed under the control of the second controller 21 of the control board 20 and under the control of the third controller 31 of the network board 30. For ease of explanation, the second controller 21 and the third controller 31, which are main bodies of the control, are partially omitted in the following description.

The control board 20 and the network board 30 perform USB communication settings (S200). Note that, since this operation is the same as the communication between the control board 20 and the medium processing board 10, some portions of the description will be omitted.

The third communicator 32 of the network board 30 starts operation as a USB device. The third communicator 32 generates a voltage of 5V on the VBUS line.

On the other hand, the second communicator 22 of the control board 20 starts operation as a USB host. When detecting the generation of the voltage of 5V on the VBUS line performed by the network board 30, the second communicator 22 detects that USB coupling with the network board 30 has been established (S201).

The control board 20 requests device information from the network board 30 via the second communicator 22 (S202).

The network board 30 transmits the device information stored in the memory of the third communicator 32 or the third storage 33 to the control board 20 through the third communicator 32 (S203).

The second controller 21 of the control board 20 specifies and executes a device driver corresponding to the network board 30 from among the plurality of USB device drivers stored in the second storage 23 based on the device information received from the network board 30.

The control board 20 transmits an initialization command to the network board 30 (S204). Based on the initialization command, the third communicator 32 of the network board 30 resets a coupling state of the USB bus.

As a result, USB coupling is established between the control board 20 and the network board 30 (S205).

On the other hand, the third controller 31 of the network board 30 reads, from the third storage 33, software pertaining to processing based on the Ethernet communication protocol and a driver pertaining to the communication using the Ethernet and executes the software and the driver.

The third controller 31 reads, from the third storage 33, the MAC address and the IP address of the external apparatus 60 to generate a frame, and transmits the frame from the external communicator 34 to the fourth communicator 62 of the external apparatus 60 via the network 2.

The third controller 31 reads the MAC address and the IP address of the medium processing apparatus 1 from the third storage 33, receives, using the external communicator 34, the frame transmitted from the fourth communicator 62 of the external apparatus 60 to the medium processing apparatus 1 via the network 2, and determines whether the frame is addressed to the medium processing apparatus 1.

When the third controller 31 determines that the received frame is addressed to the medium processing apparatus 1, data included in the frame is stored in the third storage 33 and a predetermined process is performed.

In this way, the network board 30 of the medium processing apparatus 1 may communicate with the external apparatus 60 by the Ethernet via the network 2 by means of the external communicator 34 (S210).

When the network board 30 is available for communication with the external apparatus 60 by the Ethernet, the network board 30 transmits the communication information pertaining to the Ethernet to the control board 20 (S220).

Specifically, the network board 30 transmits the first command including communication information pertaining to the Ethernet to the control board 20 (S221).

As described above, the communication information includes, for example, the MAC address or the IP address of the medium processing apparatus 1 for the Ethernet.

When receiving a first command from the network board 30 through the second communicator 22, the control board 20 generates a notification command (S230) to be transmitted to the medium processing board 10. The notification command includes communication information of the first command.

When the medium processing board 10 receives the notification command, a notification of the communication information included in the notification command is made by the notification section 50.

Next, control performed by the medium processing board 10 to read and print a check in response to a medium processing request supplied from the external apparatus 60 (S240) will be described.

When the network board 30 receives the medium processing request from the external apparatus 60 by means of the external communicator 34, the third communicator 32 transmits the medium processing request to the control board 20 (S241).

The control board 20 transmits the received medium processing request to the medium processing board 10. When the medium processing board 10 receives the medium processing request, the medium processing mechanism 40 reads an image of the check and prints information on its receipt. The medium processing board 10 transmits data of the image read by the medium processing mechanism 40 to the control board 20 as a processing result. The processing result may include information pertaining to a printing result.

The control board 20 transmits the received processing result to the network board 30 through the second communicator 22 (S242).

The network board 30 transmits the processing result received through the third communicator 32 to the external apparatus 60 through the external communicator 34.

As described above, at this time, the second controller 21 of the control board 20 may execute data conversion for converting the image data of 24 bits of RGB received from the medium processing board 10 into data of a different data format.

In this way, the control board 20, based on the medium processing request supplied from the external apparatus 60, may perform data conversion on the processing result received from the medium processing board 10 and transmit the converted processing result to the external apparatus 60 via the network board 30.

The example in which the user operates the contact point S of the switch 70 to switch the coupling destination of the contact point S to the contact point B so that a communication destination of the first communicator 12 of the medium processing board 10 is switched to the fifth communicator 64 of the external apparatus 60 will be described.

The first communicator 12 of the medium processing board 10 and the fifth communicator 64 of the external apparatus 60 are coupled to each other by the USB cable.

Figure 4:
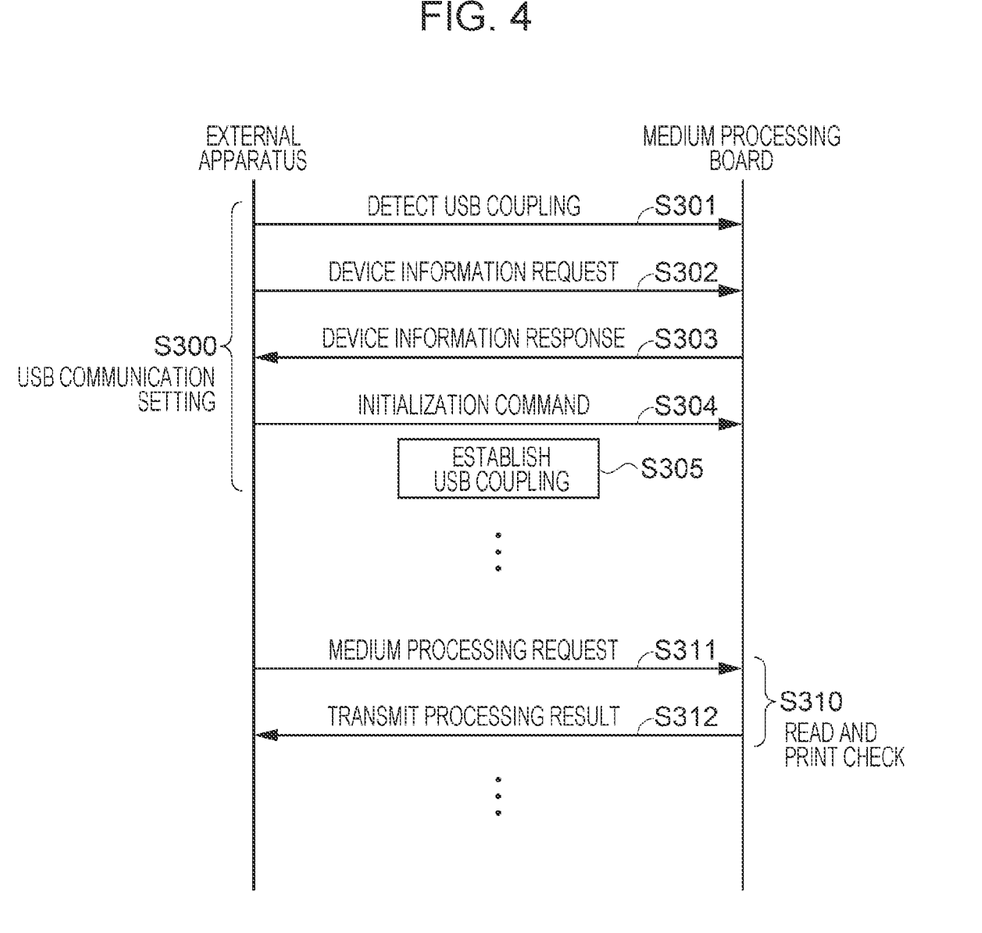
FIG. 4 is a state transition diagram illustrating control of an external apparatus and the medium processing board when the external apparatus is selected.

With reference to FIG. 4, control pertaining of the external apparatus 60 and the medium processing board 10 will be described. In the following, individual operations are executed under the control of the fourth controller 61 of the external apparatus 60 or under the control of the first controller 11 of the medium processing board 10. For ease of explanation, the fourth controller 61 and the first controller 11, which are main bodies of the control, are partially omitted in the following description.

When switching of the switch 70 is performed, communication between the first communicator 12 of the medium processing board 10 and the fifth communicator 64 of the external apparatus 60 becomes available via the USB.

First, the external apparatus 60 and the medium processing board 10 perform USB communication settings (S300). Note that, since this operation is the same as the communication between the control board 20 and the medium processing board 10 in the medium processing apparatus 1, some portions of a description will be omitted.

The first communicator 12 of the medium processing board 10 starts operation as a USB device and generates a voltage of 5 V on the VBUS line.

The external apparatus 60 starts operation as a USB host based on the OS, detects the generation of the voltage of 5V on the VBUS line using the fifth communicator 64, and detects USB coupling with the medium processing board 10 (S301).

The external apparatus 60 requests device information from the medium processing board 10 (S302). The medium processing board 10 transmits the device information stored in the memory of the first communicator 12 or the first storage 13 to the external apparatus 60 in response to the request (S303).

The fourth controller 61 of the external apparatus 60 specifies and executes a device driver corresponding to the medium processing board 10 from among the plurality of USB device drivers stored in the fourth storage 63 based on the device information received from the medium processing board 10.

The external apparatus 60 transmits an initialization command to the medium processing board 10 (S304). Based on the initialization command, the medium processing board 10 resets a USB bus coupling state through the first communicator 12. As a result, USB coupling is established between the external apparatus 60 and the medium processing board 10 (S305).

Next, control performed by the medium processing board 10 to read and print a check in response to a medium processing request supplied from the fifth communicator 64 of the external apparatus 60 (S310) based on the USB will be described. Note that, since this is the same as the example of the medium processing request supplied from the fourth communicator 62 of the external apparatus 60 via the Ethernet, as described above, some portions of a description will be omitted.

The external apparatus 60 transmits a medium processing request to the medium processing board 10 through the fifth communicator 64 via the USB (S311).

When the medium processing board 10 receives the medium processing request, the medium processing mechanism 40 reads an image of the check and prints information on its receipt. The medium processing board 10 transmits data of the image read by the medium processing mechanism 40 to the external apparatus 60 through the first communicator 12 as a processing result (S312).

At this time, the image data transmitted by the medium processing board 10 is configured by image data of 24 bits of RGB. The first controller 11 of the medium processing board 10 may execute data conversion for converting the image data of 24 bits of RGB into data of a different data format.

In this way, the medium processing board 10, based on the medium processing request supplied from the external apparatus 60, may process the check by means of the medium processing mechanism 40 and transmit the processing result to the external apparatus 60 by means of the first communicator 12.

Note that the external apparatus 60 does not transmit a notification command to the medium processing board 10 when communication between the medium processing board 10 and the external apparatus 60 through the USB is available due to the switching of the switch 70. Therefore, the notification section 50 of the medium processing apparatus 1 does not make a notification based on a notification command.

As described above, when the notification section 50 notifies the user of the communication information, the user may recognize that the medium processing apparatus 1 communicates with the external apparatus 60 through the Ethernet.

On the other hand, when the notification section 50 does not notify the user of the communication information, the user may recognize that the medium processing apparatus 1 communicates with the external apparatus 60 through the USB instead of the Ethernet.

Note that, when the first controller 11 of the medium processing board 10 does not receive a notification command through the first communicator 12, the first controller 11 may determine that the medium processing board 10 communicates with the external apparatus 60 through the USB instead of the Ethernet.

In this case, the first controller 11 may make a notification indicating that the medium processing apparatus 1 communicates with the external apparatus 60 through the USB using the notification section 50.

According to this embodiment described above, when a communication destination of the medium processing board 10 is switched to the control board 20 by the switch 70, the medium processing apparatus 1 may make a notification of communication information based on the Ethernet used for communication between the network board 30 and the external apparatus 60 through the notification section 50.

When the notification section 50 notifies the user of the communication information based on the Ethernet, the user may recognize that the medium processing apparatus 1 communicates with the external apparatus 60 through the Ethernet.

Although this embodiment has been described in detail with reference to the drawings above, specific configurations are not limited to those in the embodiment, and may be changed, replaced, deleted, or the like without departing from the scope of the present disclosure.

The external communicator 34 of the network board 30 and the fourth communicator 62 of the external apparatus 60 may have respective communication circuits and respective antennas based on a wireless communication standard, such as IEEE802.11b/g/a so as to wirelessly communicate with each other. In this case, the external communicator 34 and the fourth communicator 62 may use a communication method that does not involve the network 2 or may use a communication method using an AP (Access Point). Furthermore, the external communicator 34 and the fourth communicator 62 may employ a so-called wireless PAN (Personal Area Network) or may employ Bluetooth (registered trademark), ZigBee (registered trademark), or the like as long as a distance between the medium processing apparatus 1 and the external apparatus 60 is in a range from approximately 10 m to approximately 20 m. In this case, the communication information is at least one of a communication address, a communication ID, and the like, that is information pertaining to a communication standard.

Although the first communicator 12 of the medium processing board 10, the second communicator 22 of the control board 20, the third communicator 32 of the network board 30, and the fifth communicator 64 of the external apparatus 60 have been described in the example of the communication method based on the USB standard, a communication circuit employing any other serial communication method, such as RS-232C, RS-422A, or RS-485, may be employed.

The external apparatus 60 may be a smartphone, a laptop, or any other portable device.

Although the printer is described in the example of an ink jet head, any printing method may be employed. For example, a thermal head may be employed.

Although the medium is described in the example of a check, the medium may also be other forms of paper, such as cut paper, a slip, or a form.

What is claimed is:

1. A medium processing apparatus comprising:
   a medium processing mechanism that processes a medium;
   a first board configured to communicate with an external apparatus by a first communication method and control the medium processing mechanism;
   a second board configured to communicate with the first board by the first communication method;
   a third board configured to communicate with the second board by the first communication method and communicate with the external apparatus by a second communication method different from the first communication method;
   a switcher that switches a communication destination of the first board to the second board or the external apparatus; and
   a notification section that is a display or a speaker and that makes, when the communication destination of the first board is switched to the second board by the switcher, a notification of communication information based on the second communication method, wherein
   the third board transmits, when being available for communication with the external apparatus, a first command including the communication information to the second board,
   the second board transmits, when receiving the first command, a second command including the communication information to the first board, and
   the first board makes, when receiving the second command, a notification of the communication information using the notification section.

2. The medium processing apparatus according to claim 1, wherein the first board determines that the communication destination is switched to the second board by the switcher when receiving the second command.

3. A medium processing apparatus comprising:
   a medium processing mechanism that processes a medium;
   a first board configured to communicate with an external apparatus by a first communication method and control the medium processing mechanism;
   a second board configured to communicate with the first board by the first communication method;
   a third board configured to communicate with the second board by the first communication method and communicate with the external apparatus by a second communication method different from the first communication method;
   a switcher that switches a communication destination of the first board to the second board or the external apparatus; and
   a notification section that is a display or a speaker and that makes, when the communication destination of the first board is switched to the second board by the switcher, a notification of communication information based on the second communication method, wherein
   the first board processes, when receiving a medium processing request from the external apparatus through the third board and the second board, the medium using the medium processing mechanism so as to transmit a result of the processing to the second board, and
   the second board converts the received processing result and transmits the processing result to the external apparatus through the third board.

4. A medium processing apparatus comprising:
   a medium processing mechanism that processes a medium;
   a first board configured to communicate with an external apparatus by a first communication method and control the medium processing mechanism;
   a second board configured to communicate with the first board by the first communication method;
   a third board configured to communicate with the second board by the first communication method and communicate with the external apparatus by a second communication method different from the first communication method;
   a switcher that switches a communication destination of the first board to the second board or the external apparatus; and
   a notification section that is a display or a speaker and that makes, when the communication destination of the first board is switched to the second board by the switcher, a notification of communication information based on the second communication method, wherein
   the first communication method is a serial communication method, the second board is on a host side in the serial communication method, and the first and third boards are on a device side in the serial communication method, and
   the second communication method is a network communication method.

5. A method for controlling a medium processing apparatus including a medium processing mechanism that processes a medium, a first board configured to communicate with an external apparatus by a first communication method and control the medium processing mechanism, a second board configured to communicate with the first board by the first communication method, a third board configured to communicate with the second board by the first communication method and communicate with the external apparatus by a second communication method different from the first communication method, a switcher that switches a communication destination of the first board to the second board or the external apparatus, and a notification section, the method comprising:
- making, by the notification section, when the communication destination of the first board is switched to the second board by the switcher, a notification of communication information based on the second communication method, wherein
- the third board transmits, when being available for communication with the external apparatus, a first command including the communication information to the second board,
- the second board transmits, when receiving the first command, a second command including the communication information to the first board, and
- the first board makes, when receiving the second command, a notification of the communication information using the notification section.

\* \* \* \* \*